United States Patent
Yamamoto et al.

(10) Patent No.: US 9,724,261 B2
(45) Date of Patent: Aug. 8, 2017

(54) HANDCART

(71) Applicant: Murata Manufacturing Co., Ltd., Kyoto (JP)

(72) Inventors: Shinya Yamamoto, Kyoto (JP); Yoshitaka Hane, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 15/273,055

(22) Filed: Sep. 22, 2016

(65) Prior Publication Data
US 2017/0007492 A1 Jan. 12, 2017

Related U.S. Application Data

(63) Continuation of application No. PCT/JP2015/056295, filed on Mar. 4, 2015.

(30) Foreign Application Priority Data

Mar. 24, 2014 (JP) ................................ 2014-059421

(51) Int. Cl.
*B60G 17/00* (2006.01)
*A61H 3/04* (2006.01)
(Continued)

(52) U.S. Cl.
CPC ............... *A61H 3/04* (2013.01); *B62B 3/008* (2013.01); *B62B 3/02* (2013.01);
(Continued)

(58) Field of Classification Search
CPC .... A61G 5/022; A61G 5/024; A61G 2203/42; A61H 2201/5069; A61H 3/04;
(Continued)

(56) References Cited

U.S. PATENT DOCUMENTS 9,393,698 B1 * 7/2016 Vo ............................ A61G 5/04
9,423,795 B2 * 8/2016 Araki ................... G05D 1/0268
(Continued)

FOREIGN PATENT DOCUMENTS

| JP | 2001-170119 A | 6/2001 |
| WO | 9841182 A1 | 9/1998 |
| WO | 2012-114597 A1 | 8/2012 |

OTHER PUBLICATIONS

International Search Report issued in Japanese Patent Application No. PCT/JP2015/056295 dated Jun. 9, 2015.
(Continued)

*Primary Examiner* — Toan To
(74) *Attorney, Agent, or Firm* — Pearne & Gordon LLP (57) ABSTRACT

A handcart includes a main body, main wheels, support portions, auxiliary wheels, an extended portion, connection portions, a tilt angle sensor, and a gyro sensor. The main body is supported at one end thereof to be rotatable in a pitch direction relative to a pair of the main wheels. A bar-shaped connection portion of the extended portion is inserted through a tube portion at another end of the main body. The extended portion extends from the other end of the main body to a rear side in a travelling direction of the handcart. A region of each support portion from a rotation shaft of the main wheel to a rotation shaft of the auxiliary wheel and the extended portion are connected to each other by the connection portion. The connection portion is supported to be rotatable in the pitch direction relative to the support portion and the extended portion.

4 Claims, 8 Drawing Sheets

(51) Int. Cl.
*B62B 3/00* (2006.01)
*B62B 3/02* (2006.01)
(52) U.S. Cl.
CPC ............. *A61H 2003/043* (2013.01); *A61H 2201/0173* (2013.01); *A61H 2201/5007* (2013.01); *A61H 2201/5058* (2013.01); *A61H 2201/5069* (2013.01); *A61H 2201/5079* (2013.01)
(58) Field of Classification Search
CPC ...... A61H 2003/043; A61H 2201/0173; A61H 2201/5007
USPC ..... 180/19.2, 19.3; 280/6.15; 135/66, 67, 85
See application file for complete search history.

(56) References Cited

U.S. PATENT DOCUMENTS

| | | | | |
|---|---|---|---|---|
| 9,603,761 | B2* | 3/2017 | Fukunaga | A61G 5/022 |
| 2010/0243344 | A1* | 9/2010 | Wyrobek | B25J 5/007 |
| | | | | 180/21 |
| 2011/0067940 | A1* | 3/2011 | Takenaka | B62K 11/007 |
| | | | | 180/218 |
| 2011/0206489 | A1* | 8/2011 | Ford | B66F 9/07513 |
| | | | | 414/639 |
| 2012/0289392 | A1* | 11/2012 | Cheich | B31D 5/0047 |
| | | | | 493/464 |
| 2013/0306120 | A1* | 11/2013 | Fukunaga | A61H 3/04 |
| | | | | 135/66 |
| 2014/0125021 | A1* | 5/2014 | Du Toit | B62B 5/0033 |
| | | | | 280/47.34 |
| 2015/0053042 | A1* | 2/2015 | Shirakawa | B62B 5/0073 |
| | | | | 74/523 |
| 2015/0183482 | A1* | 7/2015 | Kubo | A61H 3/04 |
| | | | | 180/209 |
| 2016/0221594 | A1* | 8/2016 | Kubo | B62B 5/068 |
| 2017/0001656 | A1* | 1/2017 | Katayama | B62B 5/0069 |

OTHER PUBLICATIONS

Written Opinion issued in in Japanese Patent Application No. PCT/JP2015/056295 dated Jun. 9, 2015.

* cited by examiner

HANDCART

This is a continuation of International Application No. PCT/JP2015/056295 filed on Mar. 4, 2015 which claims priority from Japanese Patent Application No. 2014-059421 filed on Mar. 24, 2014. The contents of these applications are incorporated herein by reference in their entireties.

BACKGROUND

Technical Field

The present disclosure relates to a handcart that includes wheels and performs inverted pendulum control.

Hitherto, handcarts that include wheels and perform inverted pendulum control are known. For example, Patent Document 1 discloses a walking assist cart including a pair of wheels, a driving unit that drives the pair of wheels, a main body that is supported so as to be rotatable in a pitch direction relative to the pair of wheels, and an auxiliary wheel that is supported so as to be rotatable in the pitch direction relative to the main body. The driving unit drives a motor that rotates a shaft mounted to a main wheel. A grip portion is provided at an end of the main body at a side opposite to the pair of wheels.

A user such as an elderly person, a physically handicapped person, or the like holds the grip portion from the auxiliary wheel side and moves the walking assist cart in the front-rear direction on the ground. The walking assist cart performs inverted pendulum control in which rotation of the pair of wheels is controlled by the driving unit. Accordingly, the walking assist cart assists in walking of the user.

Patent Document 1: International Publication No. 2012/114597

BRIEF SUMMARY

However, with the walking assist cart in Patent Document 1, due to the positional relationship between the user and the walking assist cart, there is a possibility that the user leans on the end (i.e., the grip portion) of the main body that is tilted in a rearward direction opposite to a travelling direction. The walking assist cart in Patent Document 1 has a structure that drives the motor in response to tilt of the main body through inverted pendulum control.

Therefore, with the walking assist cart in Patent Document 1, when the user leans on the grip portion, the main body is greatly tilted, and the motor is caused to generate great torque in response to the tilt. That is, the walking assist cart in Patent Document 1 tends to move rearward when the user leans on the grip portion.

Thus, the walking assist cart in Patent Document 1 has a problem that the user is pushed back rearward when the user leans on the grip portion.

In addition, the walking assist cart also has a problem that even when the user desires to stop at that place while leaning on the walking assist cart, the user is pushed back rearward.

Therefore, the present disclosure provides a handcart capable of performing inverted pendulum control that allows a user to be prevented or inhibited from being pushed back rearward.

A handcart of the present disclosure includes: a first wheel; a main body supported at one end thereof so as to be rotatable in a pitch direction relative to a rotation shaft of the first wheel; a support portion supported by the one end of the main body or the rotation shaft of the first wheel.

In addition, the handcart of the present disclosure includes: a second wheel supported by the support portion rearward of the first wheel in a travelling direction of the support portion by rotation of the first wheel; a detection unit configured to detect an angular change of a tilt angle of the main body in the pitch direction; and a drive control unit configured to drive and control the first wheel such that an angular change of the main body in the pitch direction relative to a target value is 0, on the basis of output of the detection unit.

Further, the handcart of the present disclosure includes: an extended portion connected to another end of the main body and extending from the other end toward a rear side in the travelling direction; and a connection portion that connects a predetermined region of the support portion and the extended portion. In addition, the connection portion is supported so as to be rotatable in the pitch direction relative to the support portion and the extended portion.

The predetermined region of the support portion is a region of the support portion from the rotation shaft of the first wheel to the rotation shaft of a second wheel. The region of the support portion from the rotation shaft of the first wheel to the rotation shaft of the second wheel includes not only a portion on the rotation shaft but also portions located above and below the rotation shaft in a height direction of the handcart.

In this configuration, a user holds the extended portion or puts their forearms on the extended portion, and moves the handcart in a front-rear direction on the ground. The handcart performs inverted pendulum control to assist in walking of the user.

With this configuration, when the user leans on the extended portion, the force applied to the extended portion in the gravitational direction by the user is distributed and transmitted via the connection portion to the first wheel and the second wheel supported by the support portion.

Thus, even when the user leans on the extended portion, moment that rotates the main body does not occur, so that the main body is not tilted. That is, because of the inverted pendulum control, the handcart having this configuration does not tend to move rearward.

Therefore, when the user leans on the extended portion, it is possible to prevent or inhibit the user from being pushed back rearward. In addition, it is possible for the user to stop at that place while leaning on the handcart having this configuration.

Meanwhile, in this configuration, the main body is supported at the one end thereof so as to be rotatable in the pitch direction relative to the rotation shaft of the first wheel, and the connection portion is supported so as to be rotatable in the pitch direction relative to the support portion and the extended portion.

Thus, it is possible for the user to tilt the main body in the front-rear direction by pushing the extended portion forward or rearward. Accordingly, the handcart having this configuration is able to perform inverted pendulum control in accordance with the tilt of the main body to assist in walking of the user.

Therefore, according to the present disclosure, it is possible to provide a handcart capable of performing inverted pendulum control that allows the user to be prevented or inhibited from being pushed back rearward when the user leans on the extended portion.

In addition, the support portion and the extended portion can be parallel or substantially parallel to each other, and the main body and the connection portion are parallel or substantially parallel to each other.

With this configuration, when the user tilts the main body in the front-rear direction by pushing the extended portion forward or rearward, the connection portion is tilted in conjunction with the main body, so that the parallel state or substantially parallel state to the main body is maintained.

Similarly, the extended portion is also tilted in conjunction with the main body, so that the extended portion maintains the parallel state or substantially parallel state to the support portion. Accordingly, by providing an upper surface of the extended portion such that the upper surface is parallel or substantially parallel to a horizontal ground, the upper surface of the extended portion is always parallel or substantially parallel to the horizontal ground even when the user pushes the extended portion forward or rearward to tilt the main body in the front-rear direction. Thus, the user is allowed to place baggage or the like on the extended portion.

Therefore, according to the present disclosure, the usability for the user improves.

In addition, the connection portion can extend in the vertical direction.

With this configuration, when the user leans on the extended portion, the force applied to the extended portion in the gravitational direction by the user is easily transmitted via the connection portion to the first wheel and the second wheel supported by the support portion.

Therefore, according to the present disclosure, it is possible to prevent or inhibit the user from being pushed back rearward.

According to the present disclosure, it is possible to provide a handcart capable of performing inverted pendulum control that allows a user to be prevented or inhibited from being pushed back rearward.

DETAILED DESCRIPTION

Hereinafter, a handcart 100 that is a first embodiment of the present disclosure will be described.

Figure 1:
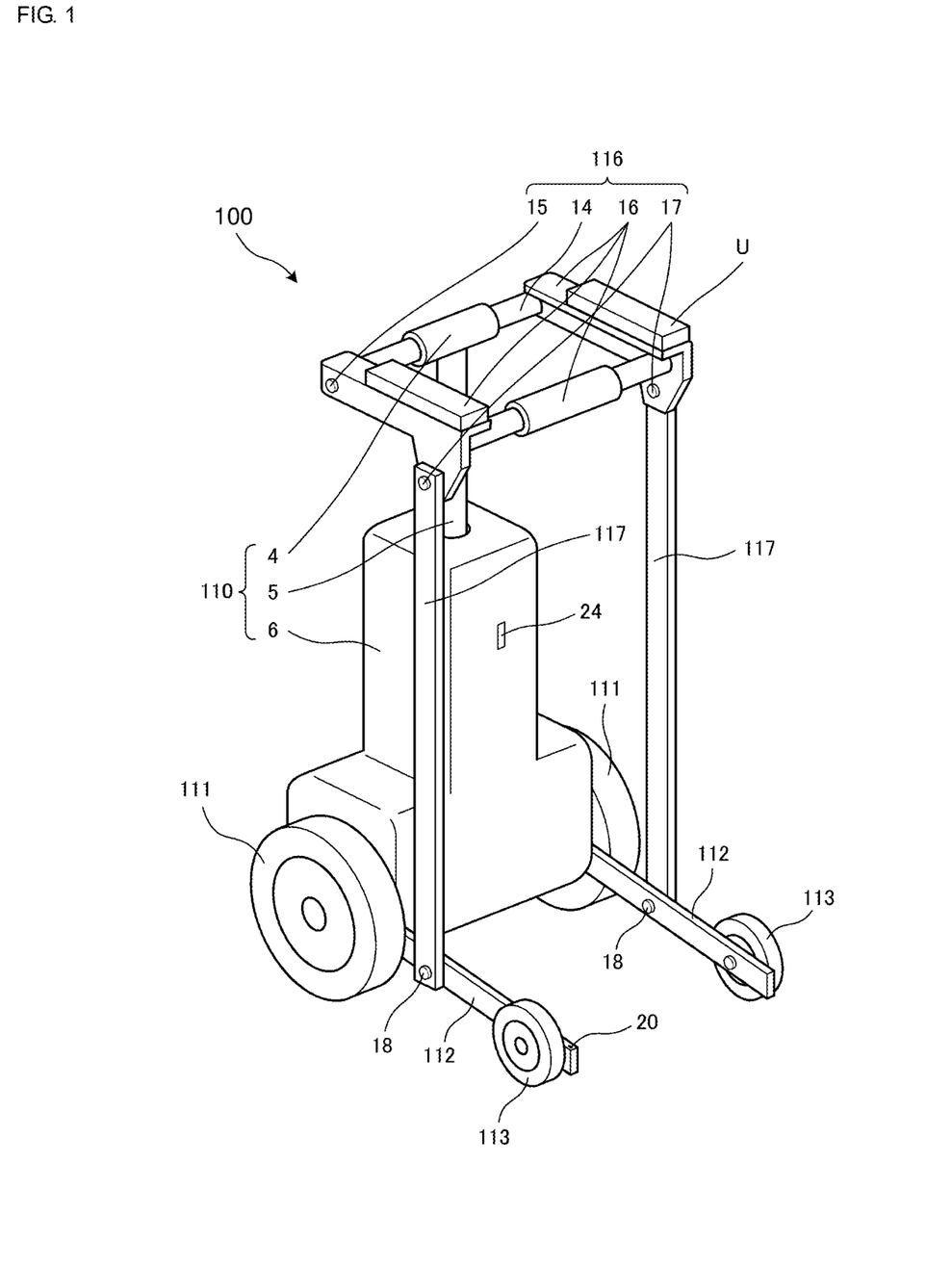
FIG. 1 is an external perspective view of a handcart 100 that is a first embodiment of the present disclosure.
Figure 2:
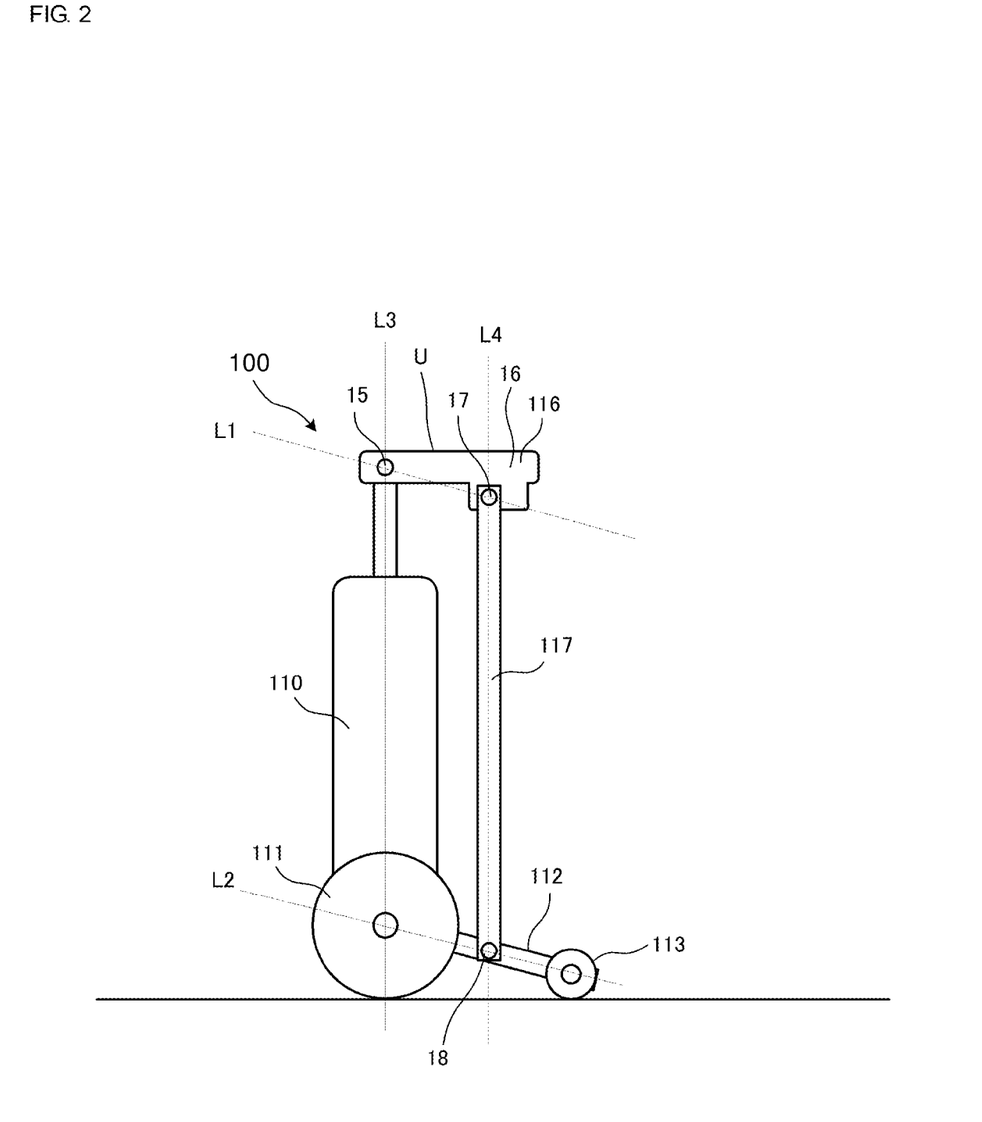
FIG. 2 is a schematic side view of the handcart 100 shown in FIG. 1.

FIG. 1 is an external perspective view of the handcart 100 that is the first embodiment of the present disclosure. FIG. 2 is a schematic side view of the handcart 100 shown in FIG. 1.

As shown in FIGS. 1 and 2, the handcart 100 includes a main body 110, main wheels 111, support portions 112, auxiliary wheels 113, an extended portion 116, connection portions 117, a tilt angle sensor 20, and a gyro sensor 24. In the embodiment, the handcart 100 is a walking assist cart that assists in walking of a user such as an elderly person, a physically handicapped person, or the like. Other than this, the handcart 100 is used, for example, as a stroller or a shopping cart.

The main wheels 111 correspond to a "first wheel" of the present disclosure. In addition, the auxiliary wheels 113 correspond to a "second wheel" of the present disclosure. Moreover, one of or both the tilt angle sensor 20 and the gyro sensor 24 correspond to a "detection unit" of the present disclosure.

The two support portions 112 are bar-shaped members. In addition, each support portion 112 is supported at one end thereof so as to be rotatable in a pitch direction relative to a rotation shaft of a pair of the main wheels 111. The tilt angle sensor 20 is mounted on the upper surface of the support portion 112. Moreover, the auxiliary wheel 113 is rotatably supported at another end of each support portion 112.

The pair of the main wheels 111 is mounted on a drive shaft so as to be opposed to each other, and rotate synchronously. A pair of the auxiliary wheels 113 is rotatably supported by the support portions 112 rearward of the main wheels 111 in the travelling direction of the handcart 100. Thus, in the handcart 100, the pair of the main wheels 111 is front wheels, and the pair of the auxiliary wheels 113 is rear wheels. In addition, the diameter of each main wheel 111 is longer than the diameter of each auxiliary wheel 113.

It is also possible to individually drive and rotate the pair of the main wheels 111. In the embodiment, the example in which the number of the main wheels 111 is two is shown, but the number of the main wheels 111 is not limited to two. Similarly, the example in which the number of the auxiliary wheels 113 is two is also shown, but the number of the auxiliary wheels 113 is not limited to two.

The main body 110 includes: a housing portion 6 that extends in the vertical direction and has an inverted T shape; a pillar portion 5 that is connected to the upper surface of the housing portion 6 which is opposite to the ground and extends in the vertical direction; and a tube portion 4 that is connected to an end of the pillar portion 5 which is opposite to the ground and extends in a direction orthogonal to the pillar portion 5.

The gyro sensor 24 is mounted on a side surface of the housing portion 6. In addition, a later-described control unit 21, a later-described driving unit 25, and a battery (not shown) for driving, etc. are provided within the housing portion 6.

In the embodiment, the gyro sensor 24 is mounted on the side surface of the housing portion 6, but the position of the gyro sensor 24 is not limited thereto. The gyro sensor 24 may be mounted within the housing portion 6.

The main body 110 is supported at one end thereof so as to be rotatable in the pitch direction relative to the pair of the main wheels 111. A bar-shaped connection portion 14 included in the extended portion 116 is inserted through the tube portion 4 located at the other end of the main body 110. The connection portion 14 is fixed to the tube portion 4 such that the connection 14 does not rotate relative to the tube portion 4. Accordingly, the main body 110 is connected at the other end thereof to the extended portion 116.

The extended portion 116 extends from the other end of the main body 110 toward the rear side in the travelling direction of the handcart 100 (i.e., the user side). The extended portion 116 includes: the bar-shaped connection portion 14 that is inserted through the tube portion 4; a first hinge portion 15 that rotates together with a grip portion 16 relative to the connection portion 14; the U-shaped grip portion 16; and second hinge portions 17 that rotate together with the grip portion 16 relative to the connection portions 117. The extended portion 116 forms a frame shape by the bar-shaped connection portion 14 and the U-shaped grip portion 16.

In addition, the extended portion 116 is provided with a user interface (a later-described user I/F 28 shown in FIG. 3). The user I/F 28 is provided with a power switch and the like of the handcart 100.

A region of each support portion 112 from the rotation shaft of the main wheel 111 to a rotation shaft of the auxiliary wheel 113 and the grip portion 16 are connected to each other by the connection portion 117. Here, this connection is set such that, when the tilt of the main body 110 in the pitch direction has a target value, a line of a force applied to the grip portion 16 in the gravitational direction by the user passes between the main wheel 111 and the auxiliary wheel 113 as the position of the force. With this setting, a force applied to the grip portion 16 in the gravitational direction by the user is less likely to act as moment that tilts the main body 110.

In addition, the grip portion 16 is supported by the second hinge portions 17 so as to be rotatable in the pitch direction relative to the connection portions 117. Moreover, each connection portion 117 is supported by a third hinge portion 18 so as to be rotatable in the pitch direction relative to the support portion 112.

Therefore, each connection portion 117 is supported so as to be rotatable in the pitch direction relative to the support portion 112 and the extended portion 116.

In addition, each support portion 112 and the extended portion 116 are parallel or substantially parallel to each other. Moreover, the main body 110 and each connection portion 117 are parallel or substantially parallel to each other. Also, each connection portion 117 extends in the vertical direction.

Here, four dotted lines shown in FIG. 2 indicate a first straight line L1 passing through a rotation shaft of the first hinge portion 15 and a rotation shaft of the second hinge portion 17, a second straight line L2 passing through the rotation shaft of the main wheel 111 and a rotation shaft of the third hinge portion 18, a third straight line L3 passing through the main body 110 in the longitudinal direction thereof, and a fourth straight line L4 passing through the connection portion 117 in the longitudinal direction thereof.

Giving a detailed description, each support portion 112 and the extended portion 116 being parallel to each other means that the first straight line L1 and the second straight line L2 do not intersect each other even when being extended. In addition, each support portion 112 and the extended portion 116 being substantially parallel to each other means that the first straight line L1 and the second straight line L2 intersect each other when being extended and the angle formed between the first straight line L1 and the second straight line L2 is greater than 0 degree and less than 5 degrees.

In addition, the main body 110 and each connection portion 117 are parallel or substantially parallel to each other. The main body 110 and each connection portion 117 being parallel to each other means that the third straight line L3 and the fourth straight line L4 do not intersect each other even when being extended. Moreover, the main body 110 and each connection portion 117 being substantially parallel to each other means that the third straight line L3 and the fourth straight line L4 intersect each other when being extended and the angle formed between the third straight line L3 and the fourth straight line L4 is greater than 0 degree and less than 5 degrees.

Therefore, during stop of the handcart 100, each support portion 112, the extended portion 116, the main body 110, and each connection portion 117 form a parallelogram or substantially parallelogram frame shape when being seen in a side view.

Next, the configuration and basic operation of the handcart 100 will be described.

Figure 3:
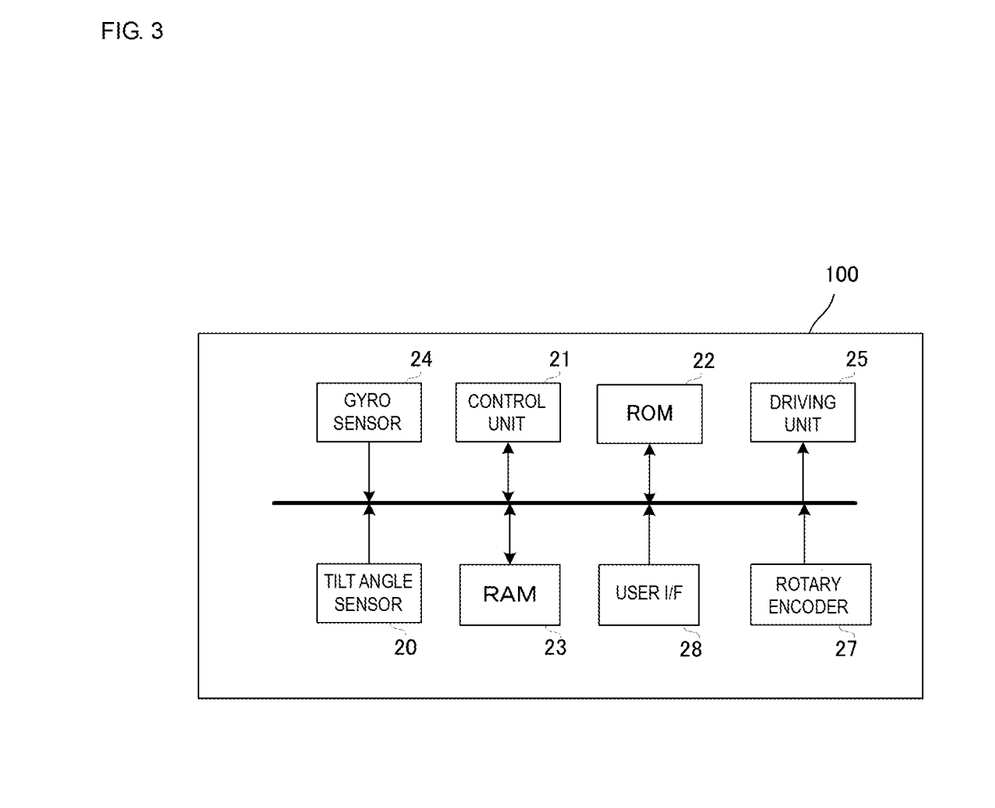
FIG. 3 is a control block diagram showing the configuration of the handcart 100 shown in FIG. 1.

FIG. 3 is a control block diagram showing the configuration of the handcart 100 shown in FIG. 1. The handcart 100 includes the tilt angle sensor 20, the control unit 21, a ROM 22, a RAM 23, the gyro sensor 24, the driving unit 25, a rotary encoder 27, and the user I/F 28.

The control unit 21 is a control unit or controller that centrally controls the handcart 100, and achieves various operations by reading a program stored in the ROM 22 and expanding the program into the RAM 23.

The driving unit 25 is provided within the housing portion 6 and drives the pair of the main wheels 111.

The rotary encoder 27 is provided within the housing portion 6, detects a rotation angle of each main wheel 111, and outputs a detection result to the control unit 21. The control unit 21 differentiates the rotation angle of each main wheel 111 inputted from the rotary encoder 27, to calculate the angular velocity of the main wheel 111.

The tilt angle sensor 20 detects the tilt angle of the support portion 112 relative to the vertical direction, and outputs the tilt angle to the control unit 21.

The gyro sensor 24 detects the angular velocity of the main body 110 in the pitch direction (a rotation direction about the rotation shaft of the main wheels 111 in FIG. 1), and outputs the angular velocity to the control unit 21.

In the embodiment, the example in which the rotary encoder 27 is used as a means for detecting whether rotation of each main wheel 111 stops is shown, but the means is not limited thereto, and any other sensor may be used.

Similarly, in the embodiment, the example in which the tilt angle sensor 20 is used as a means for detecting the tilt angle of the support portion 112 relative to the vertical direction is shown, but the means is not limited thereto, and any other sensor may be used.

Similarly, in the embodiment, the example in which the gyro sensor 24 is used as a means for detecting an angular change of the tilt angle of the main body 110 in the pitch direction is shown, but the means is not limited thereto. An acceleration sensor may be used, or any other sensor may be used.

On the basis of the detection result from the gyro sensor 24, the control unit 21 rotates the main wheels 111 by the driving unit 25 and performs inverted pendulum control, such that an angular change of the main body 110 in the pitch direction is 0 and the tilt angle of the main body 110 relative to the vertical direction has a target value (e.g., 0 or a value close to 0).

The inverted pendulum control will be described in detail below.

The control unit 21 calculates the tilt angle of the main body 110 in the pitch direction on the basis of the detection result from the tilt angle sensor 20. By so doing, the control unit 21 estimates a tilt angle of the ground on which the handcart 100 is present, relative to the vertical direction.

Then, the control unit 21 calculates the difference between a target tilt angle (e.g., 0 degree which is the vertical direction) of the main body 110 in the pitch direction and the tilt angle of the main body 110 in the pitch direction, and multiplies the difference by an appropriate gain to calculate a target angular velocity of the main body 110 in the pitch direction.

In addition, the control unit 21 calculates a tilt angular velocity of the main body 110 on the basis of the detection result from the gyro sensor 24. Furthermore, the control unit 21 calculates the difference between the target angular velocity of the main body 110 in the pitch direction and the tilt angular velocity of the main body 110, performs appropriate gain or PID control calculation on the difference, and calculates a torque that causes the tilt angle of the main body 110 in the pitch direction to be 0 relative to the vertical direction and makes the pitch tilt angular velocity of the main body 110 close to 0.

Then, the control unit 21 outputs the calculated torque value to the driving unit 25.

The driving unit 25 drives the motor that rotates the shaft mounted to the pair of the main wheels 111. The driving unit 25 applies the torque value inputted from the control unit 21, to the motor for the main wheels 111 to rotate the main wheels 111.

Figure 4:
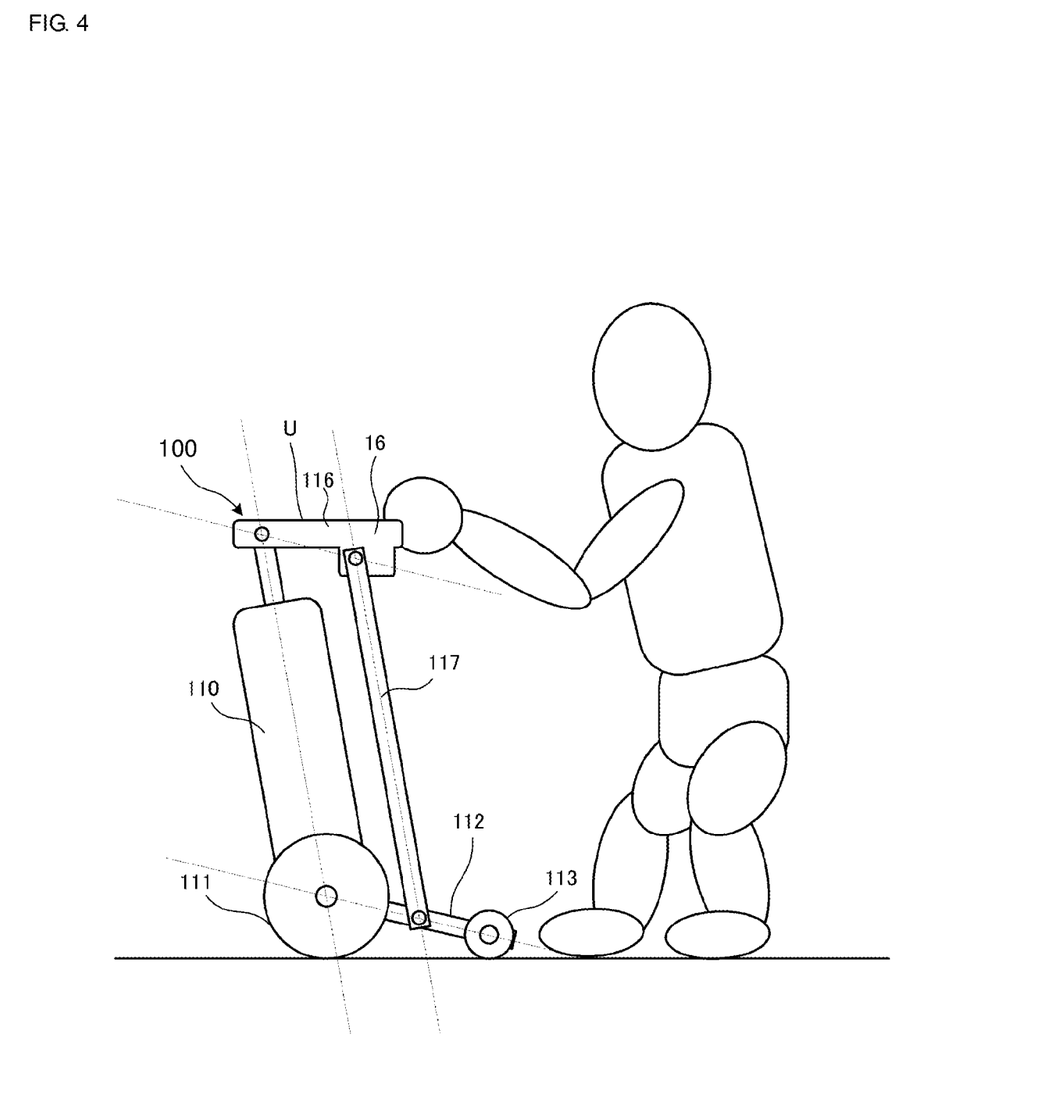
FIG. 4 is a schematic side view of the handcart 100 shown in FIG. 1 when the handcart 100 moves forward.
Figure 5:
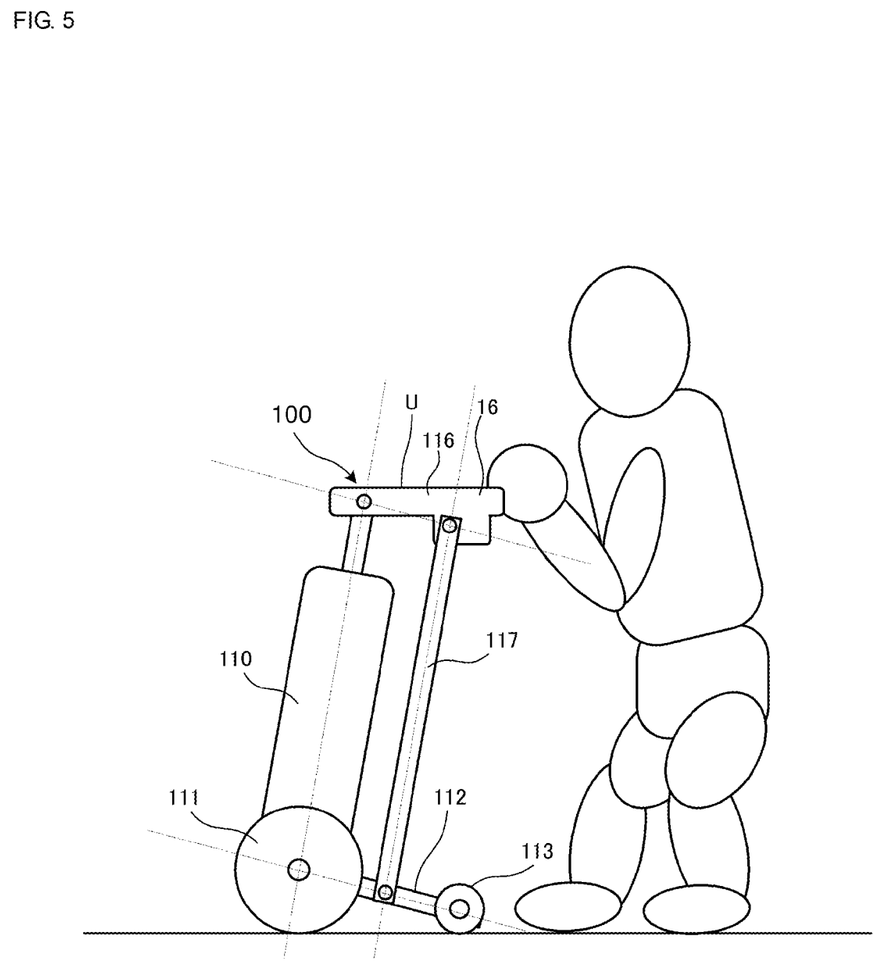
FIG. 5 is a schematic side view of the handcart 100 shown in FIG. 1 when the handcart 100 moves rearward.
Figure 6:
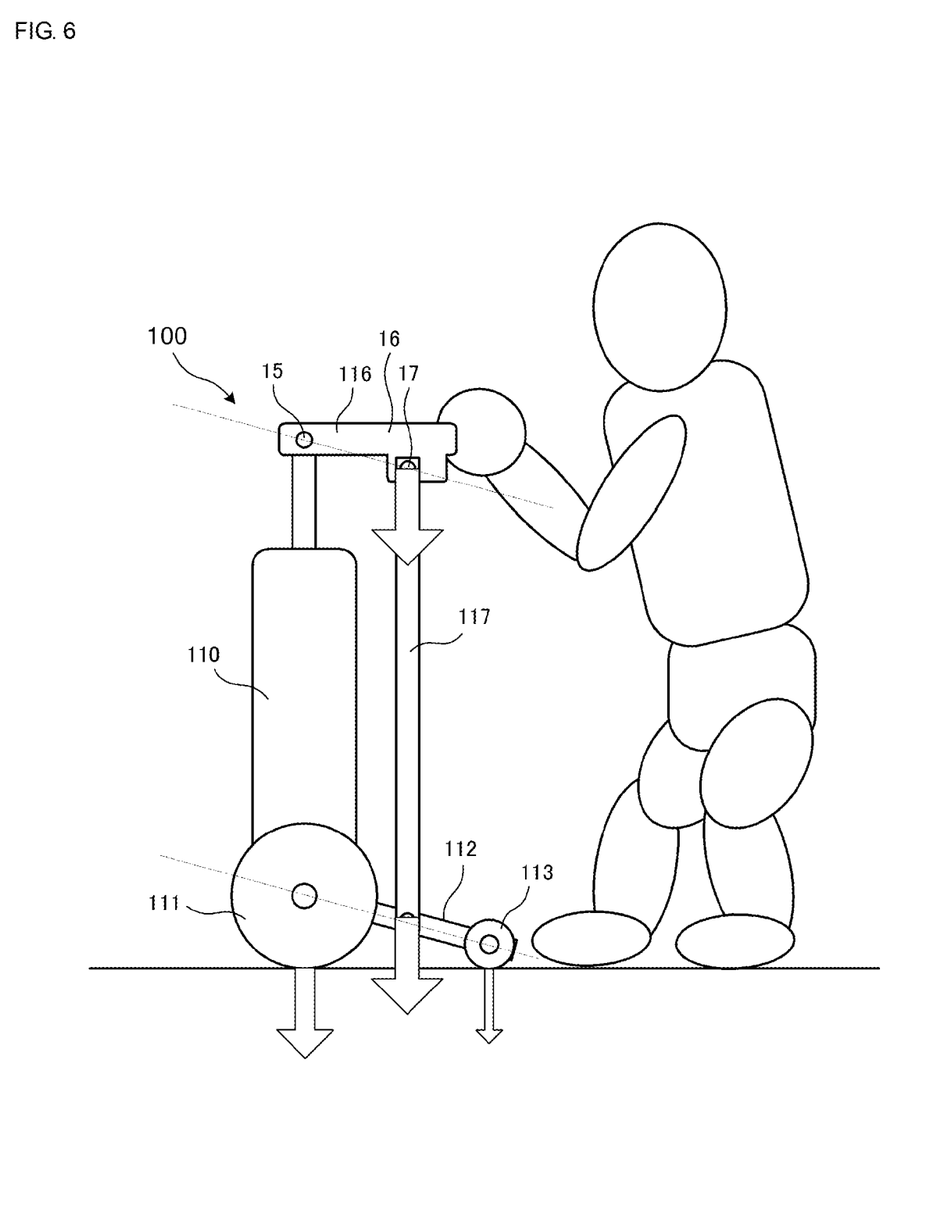
FIG. 6 is a schematic side view of the handcart 100, showing a state when a user leans on a grip portion 16.

FIG. 4 is a schematic side view of the handcart 100 shown in FIG. 1 when the handcart 100 moves forward. FIG. 5 is a schematic side view of the handcart 100 shown in FIG. 1 when the handcart 100 moves rearward. FIG. 6 is a schematic side view of the handcart 100 showing a state where the user leans on the grip portion 16. In FIG. 6, arrows indicate forces occurring at respective portions of the handcart 100.

In the above configuration, the user holds the grip portion 16 or puts their forearms on the grip portion 16 from the auxiliary wheel 113 side, and moves the handcart 100 in the front-rear direction on the ground. The handcart 100 performs inverted pendulum control to maintain a state where the main body 110 has a predetermined target tilt angle.

Thus, as shown in FIG. 4, even when the user holds the grip portion 16 and pushes the grip portion 16 forward, the main wheels 111 rotate, and the support portions 112 also move forward, so that the attitude of the main body 110 is kept constant.

On the other hand, as shown in FIG. 5, even when the user holds the grip portion 16 and pulls the grip portion 16 rearward, the main wheels 111 rotate, and the support portions 112 also move rearward, so that the attitude of the main body 110 is kept constant. In this manner, the handcart 100 performs inverted pendulum control to assist in walking of the user.

Here, when the user leans on the grip portion 16, the force applied to the grip portion 16 in the gravitational direction by the user is distributed and transmitted via the connection portions 117 to the main wheels 111 and the auxiliary wheels 113 supported by the support portions 112, as shown in FIG. 6.

Thus, even when the user leans on the grip portion 16, moment that rotates the main body 110 is less likely to occur, so that the main body 110 is less likely to be tilted. That is, because of the inverted pendulum control, the handcart 100 does not tend to move rearward.

Therefore, when the user leans on the grip portion 16, it is possible to prevent or inhibit the user from being pushed back rearward. In addition, it is possible for the user to stop at that place while leaning on the handcart 100 having this configuration.

Meanwhile, in the handcart 100, the main body 110 is supported at one end thereof so as to be rotatable in the pitch direction relative to the rotation shaft of the main wheels 111, and the connection portions 117 are supported so as to be rotatable in the pitch direction relative to the support portions 112 and the grip portion 16.

Thus, as shown in FIGS. 4 and 5, it is possible for the user to tilt the main body 110 in the front-rear direction by pushing the grip portion 16 forward or rearward. Accordingly, the handcart 100 is able to perform inverted pendulum control in accordance with the tilt of the main body 110 to assist in walking of the user.

Therefore, according to the embodiment, it is possible to provide the handcart 100 capable of performing inverted pendulum control that allows the user to be prevented or inhibited from being pushed back rearward when the user leans on the grip portion 16.

In addition, in the handcart 100, each support portion 112 and the grip portion 16 are parallel or substantially parallel to each other, and the main body 110 and each connection portion 117 are parallel or substantially parallel to each other.

Thus, with this configuration, as shown in FIGS. 4 and 5, when the user tilts the main body 110 in the front-rear direction by pushing the grip portion 16 forward or rearward, the connection portions 117 are tilted in conjunction with the main body 110, so that the parallel state or substantially parallel state to the main body 110 is maintained.

Similarly, as shown in FIGS. 4 and 5, the grip portion 16 also moves in conjunction with the main body 110, so that the grip portion 16 maintains the parallel state or substantially parallel state to the support portions 112. Accordingly, by providing an upper surface U of the grip portion 16 such that the upper surface U is parallel or substantially parallel to a horizontal ground, the upper surface U of the grip portion 16 is always parallel or substantially parallel to the horizontal ground even when the user pushes the grip portion 16 forward or rearward to tilt the main body 110 in the front-rear direction. Thus, the user is allowed to place baggage or the like on the grip portion 16.

Therefore, according to the handcart 100, the usability for the user improves.

In addition, in the handcart 100, the connection portions 117 extend in the vertical direction.

Thus, with this configuration, when the user leans on the grip portion 16, the force applied to the grip portion 16 in the gravitational direction by the user is easily transmitted via the connection portions 117 to the main wheels 111 and the auxiliary wheels 113 supported by the support portions 112, as shown in FIG. 6.

Therefore, according to the handcart 100, it is possible to prevent or inhibit the user from being pushed back rearward.

Hereinafter, a handcart 200 that is a second embodiment of the present disclosure will be described.

Figure 7:
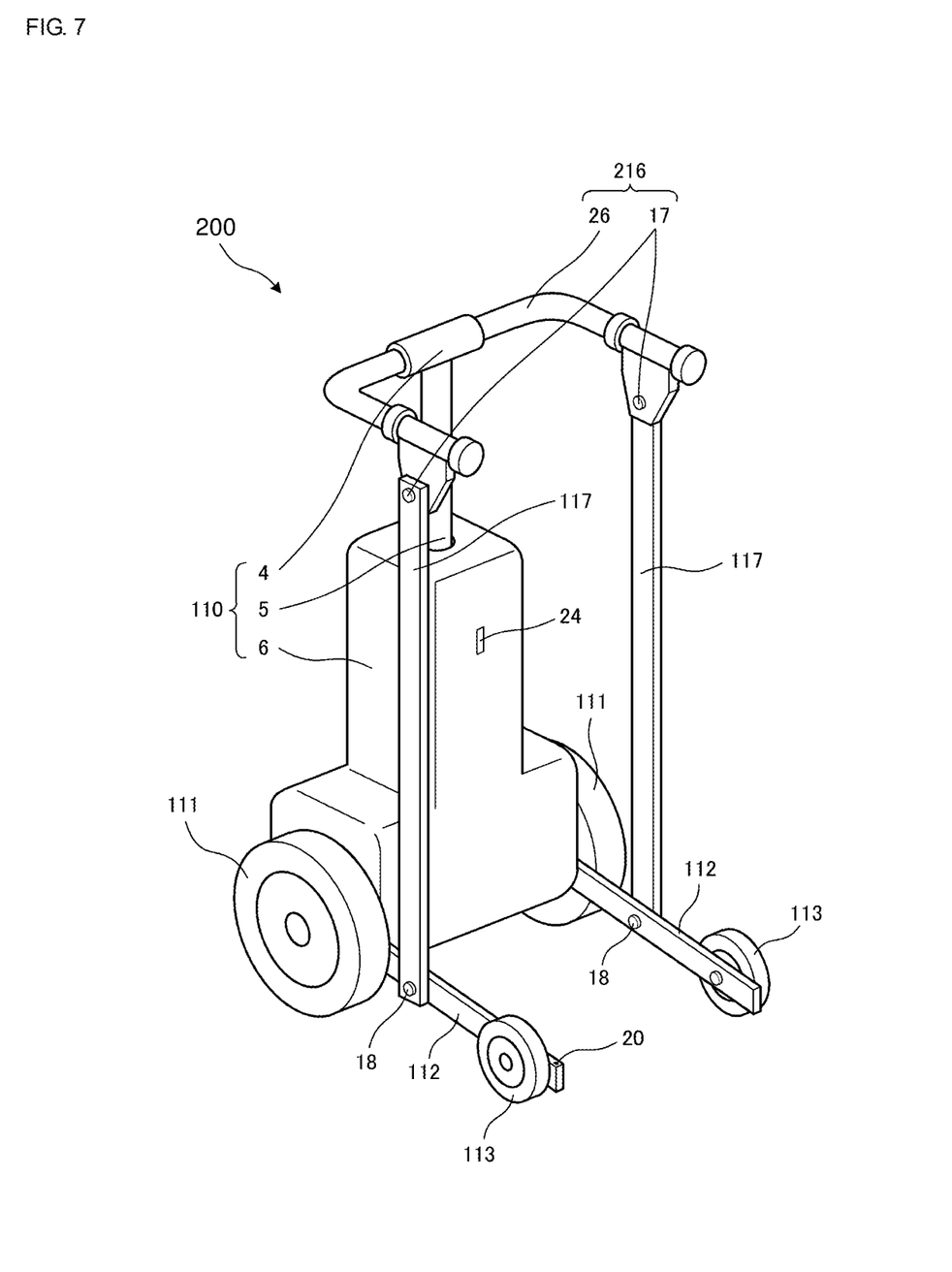
FIG. 7 is an external perspective view of a handcart 200 that is a second embodiment of the present disclosure.

FIG. 7 is an external perspective view of the handcart 200 that is the second embodiment of the present disclosure.

The handcart 200 of the second embodiment is different from the handcart 100 of the first embodiment in an extended portion 216. The extended portion 216 includes a grip portion 26 and second hinge portions 17, and does not include any connection portion 14 and any first hinge portion 15. The grip portion 26 has a U shape, is inserted through the tube portion 4 at the other end of the main body 110, and is rotatably supported by the tube portion 4.

Accordingly, the main body 110 is connected at the other end thereof to the extended portion 216. The extended portion 216 extends from the other end of the main body 110 to the rear side in the travelling direction of the handcart 200 (that is, the user side).

A region of each support portion 112 from the rotation shaft of the main wheel 111 to the rotation shaft of the auxiliary wheel 113 and the grip portion 26 are connected to each other by the connection portion 117. The connection portion 117 is supported so as to be rotatable in the pitch direction relative to the support portion 112 and the grip portion 26.

The other configuration is the same as the handcart 100.

Therefore, according to the handcart 200, the same advantageous effects as those of the handcart 100 are achieved.

Hereinafter, a handcart 300 that is a third embodiment of the present disclosure will be described.

Figure 8:
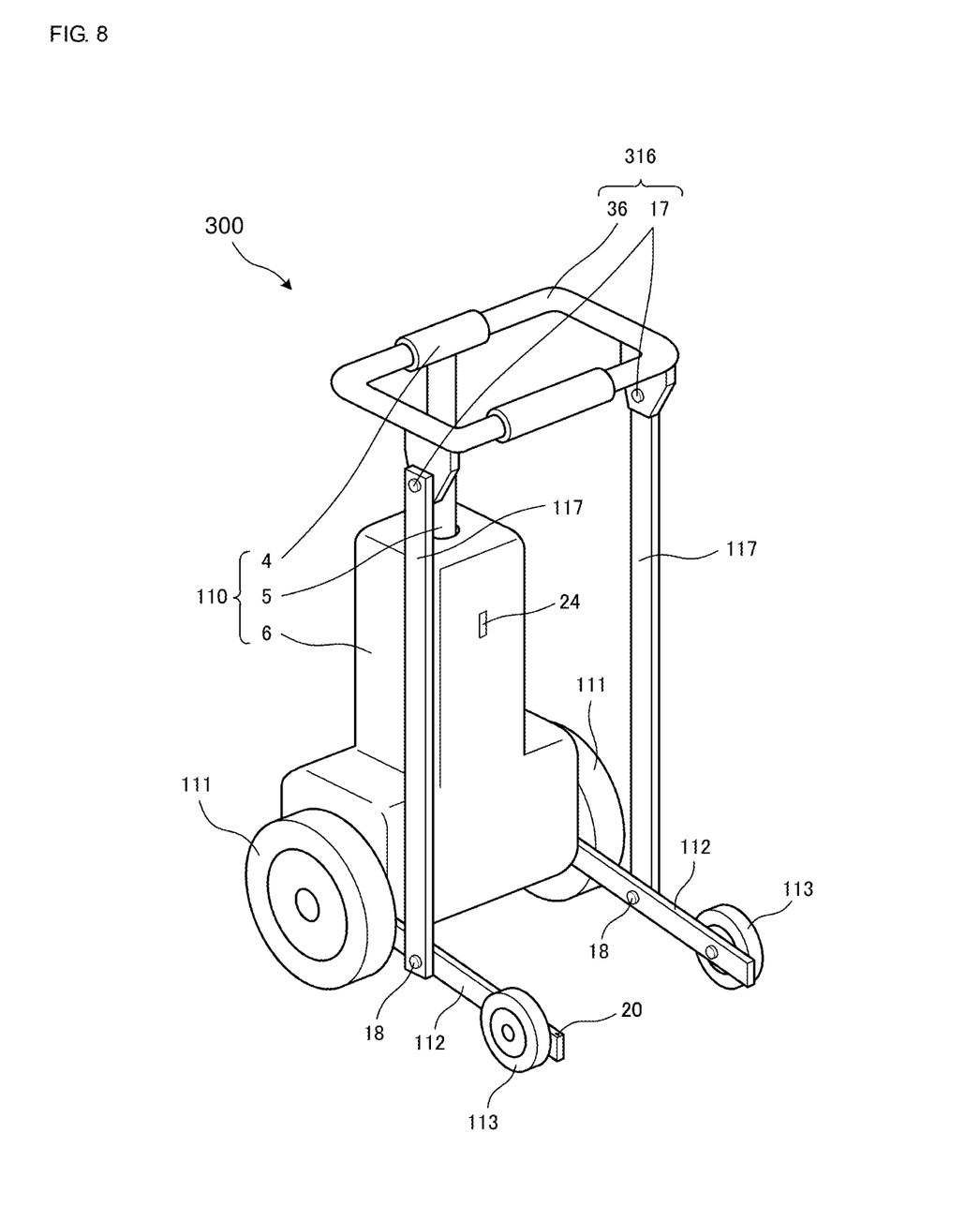
FIG. 8 is an external perspective view of a handcart 300 that is a third embodiment of the present disclosure.

FIG. 8 is an external perspective view of the handcart 300 that is the third embodiment of the present disclosure.

The handcart 300 of the third embodiment is different from the handcart 100 of the first embodiment in an extended portion 316. The extended portion 316 includes a grip portion 36 and second hinge portions 17, and does not include any connection portion 14 and any first hinge portion 15. The grip portion 36 has a rectangular frame shape, is inserted through the tube portion 4 at the other end of the main body 110, and is rotatably supported by the tube portion 4.

Accordingly, the main body 110 is connected at the other end thereof to the extended portion 316. The extended portion 316 extends from the other end of the main body 110 to the rear side in the travelling direction of the handcart 300 (i.e., the user side).

A region of each support portion 112 from the rotation shaft of the main wheel 111 to the rotation shaft of the auxiliary wheel 113 and the grip portion 36 are connected to each other by the connection portion 117. The connection portion 117 is supported so as to be rotatable in the pitch direction relative to the support portion 112 and the grip portion 36.

The other configuration is the same as the handcart 100.

Therefore, according to the handcart 300, the same advantageous effects as those of the handcart 100 are achieved.

In each of the above embodiments, each support portion 112 and the extended portion 116, 216, or 316, are parallel to each other, and the main body 110 and each connection portion 117 are parallel to each other, but the present disclosure is not limited thereto. In implementation, for example, the main body and each connection portion are parallel to each other, each support portion is parallel to the horizontal ground, and each support portion and the extended portion may not be parallel to each other.

In addition, in each of the above embodiments, each connection portion 117 extends in the vertical direction, but the present disclosure is not limited thereto. In implementation, each connection portion may extend substantially in the vertical direction.

In addition, in each of the above embodiments, as shown in FIG. 1, 7, or 8, the vicinity of the center of the region of each support portion 112 from the rotation shaft of the main wheel 111 to the rotation shaft of the auxiliary wheel 113 and the grip portion 16, 26, or 36 are connected to each other by the connection portion 117, but the present disclosure is not limited thereto. In implementation, for example, a portion of the support portion on the rotation shaft of the auxiliary wheel and the extended portion may be connected to each other by a connection portion.

In addition, in implementation, each support portion may be supported by one end of the main body, not by the rotation shaft of the main wheel. In this case as well, the region of each support portion from the rotation shaft of the main wheel 111 to the rotation shaft of the auxiliary wheel 113 and the grip portion only need to be connected to each other by a connection portion.

Finally, the description of the above embodiments is to be considered in all respects as illustrative and not limiting. The scope of the present disclosure is indicated by the appended claims rather than by the above embodiments, and all changes which come within the meaning and range of equivalency of the claims are intended to be embraced therein.

REFERENCE SIGNS LIST 4 tube portion
5 pillar portion
6 housing portion
14 connection portion
15 first hinge portion
16 grip portion
17 second hinge portion
18 third hinge portion
20 tilt angle sensor
21 control unit
22 ROM
23 RAM
24 gyro sensor
25 driving unit
26 grip portion
27 rotary encoder
28 user interface
36 grip portion
100 handcart
110 main body
111 main wheel
112 support portion
113 auxiliary wheel
116 extended portion
117 connection portion
200 handcart
216 extended portion
300 handcart
316 extended portion

The invention claimed is:

1. A handcart comprising:
a first wheel;
a main body supported at one end thereof so as to be rotatable in a pitch direction relative to a rotation shaft of the first wheel;
a support portion supported at one end by the one end of the main body or the rotation shaft of the first wheel;
a second wheel rotatably supported by another end of the support portion rearward of the first wheel in a travelling direction of the support portion by rotation of the first wheel;
a sensor configured to detect an angular change of a tilt angle of the main body in the pitch direction; and
a controller configured to drive and control the first wheel such that an angular change of the main body in the pitch direction relative to a target value is 0, on the basis of an output of the sensor, wherein
the handcart comprises:
an extended portion connected to another end of the main body and extending from the other end toward a rear side in the travelling direction; and
a connection portion connecting the extended portion and a region of the support portion from the rotation shaft of the first wheel to a rotation shaft of the second wheel and supported so as to be rotatable in the pitch direction relative to the support portion and the extended portion.

2. The handcart according to claim 1, wherein
the support portion and the extended portion are parallel or substantially parallel to each other, and
the main body and the connection portion are parallel or substantially parallel to each other.

3. The handcart according to claim 1, wherein the connection portion extends in a vertical direction.

4. The handcart according to claim 2, wherein the connection portion extends in a vertical direction.

* * * * *